Sept. 5, 1967   N. L. CARR ET AL   3,340,318
THERMAL HYDRODEALKYLATION PROCESS
Filed Nov. 22, 1966
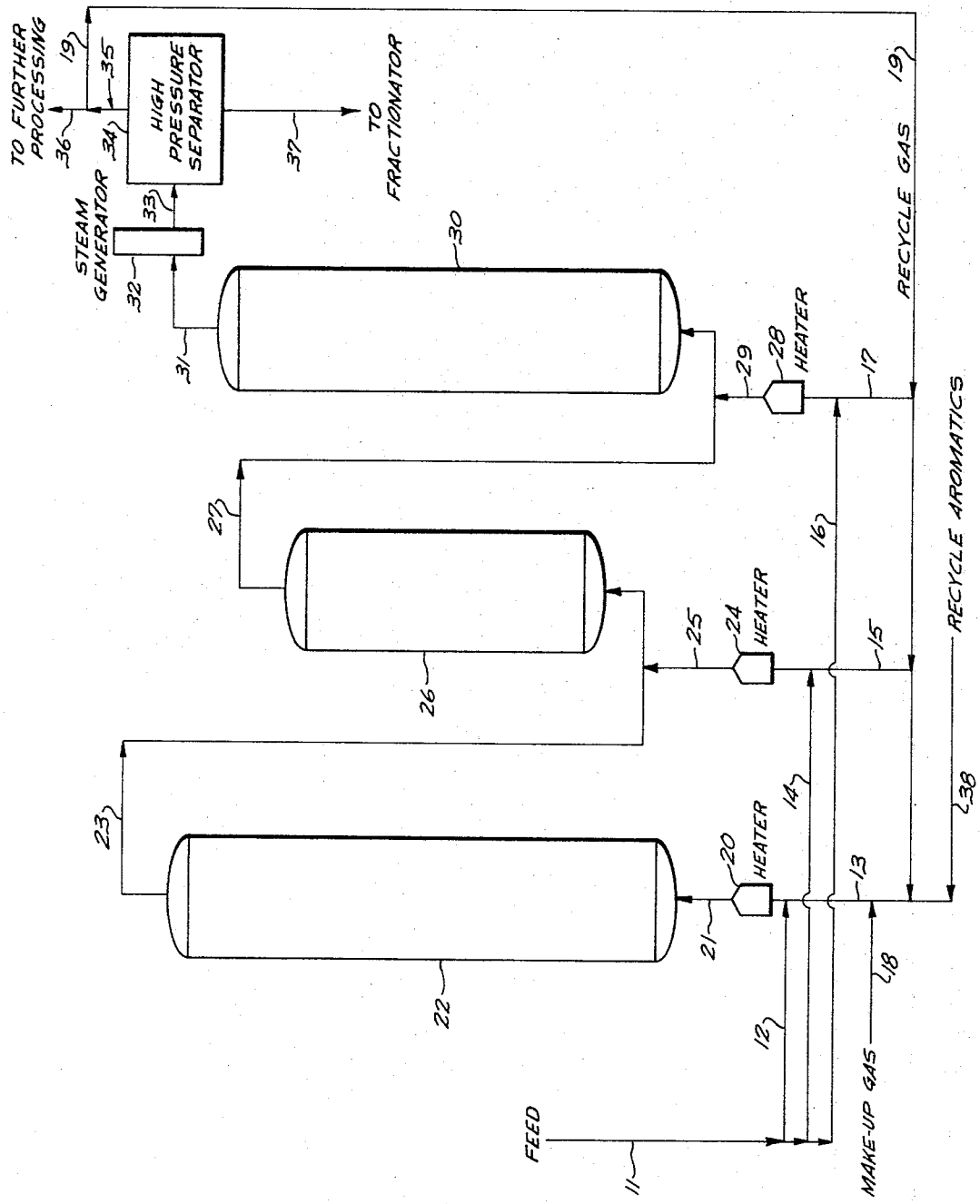
INVENTORS.
NORMAN L. CARR
MALCOLM D. FRASER
SHELDON J. KRAMER

United States Patent Office 3,340,318
Patented Sept. 5, 1967

3,340,318
THERMAL HYDRODEALKYLATION PROCESS
Norman L. Carr, Allison Park, and Malcolm D. Fraser and Sheldon J. Kramer, Pittsburgh, Pa., assignors to Gulf Research & Development Company, Pittsburgh, Pa., a corporation of Delaware
Filed Nov. 22, 1966, Ser. No. 596,158
10 Claims. (Cl. 260—672)

ABSTRACT OF THE DISCLOSURE

Temperature control is facilitated in thermal hydrodealkylation of toluene to benzene by apportioning the feed and recycle streams among three serially-connected reaction zones. The effluents from the first and second zones are thus quenched by direct admixture while serving as incremental preheat to the added reactant. Optimum results are obtained when higher aromatics and paraffins are present in the toluene feed.

---

This invention relates to a process for the thermal hydrodealkylation of alkyl benzene compounds. More particularly, this invention relates to such a process wherein the hydrocarbon feed to the thermal hydrodealkylation system contains significant amounts of heavy paraffins and/or higher alkyl benzenes as well as toluene.

Toluene can be dealkylated to benzene by subjecting it in the presence of hydrogen to an elevated temperature and elevated pressure for a controlled length of time. As a result of such reaction conditions, the methyl group is cleaved from the toluene and replaced by hydrogen. The mechanism of toluene thermal hydrodealkylation probably involves several chain reactions, initiated by the formation of hydrogen atoms and benzyl radicals. These undergo further reactions and the original toluene forms benzene and methane. When the feed contains higher alkyl benzenes, the alkyl group is cleaved and combines with hydrogen to form the corresponding higher alkane. If the higher alkyl benzene contains several alkyl groups, corresponding alkanes are formed along with benzene.

Since the thermal hydrodealkylation reaction is highly exothermic, large amounts of heat are developed in the reactor. The presence of heavy paraffins and/or higher alkyl benzenes in the feed to a thermal hydrodealkylation reactor causes excessive development of heat in the reactor due to the extremely high exothermic nature of the decomposition or hydrocracking of the heavy paraffins and/or of the alkanes produced by the thermal hydrodealkylation of higher alkyl benzenes. This causes the reactor to become difficult to operate and control and renders the thermal hydrodealkylation process very sensitive to fluctuations in inlet temperatures, compositions and flow rates. That is, a slight increase of the inlet temperature and/or a decrease in the flow rate of the feed to the reactor results in a much greater increase in the temperature of the effluent from the reactor.

For the foregoing reasons, higher alkyl benzenes and heavy paraffins are normally removed from a hydrocarbon feed stock, such as by solvent extraction, before it is introduced into a thermal hydrodealkylation reactor. However, the investment and operating costs of removing higher alkyl benzenes and heavy paraffins to produce an essentially pure toluene or toluene and benzene feed are such that it would be economically desirable to be able to efficiently operate a thermal hydrodealkylation process utilizing a feed containing significant amounts of heavy paraffins and/or higher alkyl benzenes.

It is an object of this invention to provide a process for the thermal hydrodealkylation of a hydrocarbon feed containing significant amounts of heavy paraffins and/or higher alkyl benzenes.

It is a further object of this invention to provide such a process which results in increased benzene selectivity and in which the thermal hydrodealkylation reactors are less sensitive to fluctuations in inlet temperatures, compositions and flow rates.

These and other objects are attained by the practice of this invention which, briefly, comprises providing a gaseous admixture comprising toluene and hydrogen. The gaseous admixture also may contain xylenes, higher alkyl benzenes (i.e., wherein the alkyl group contains 2 or more carbon atoms) and/or heavy paraffins (i.e., containing 6 or more carbon atoms). A portion of this gaseous admixture is introduced into each of a plurality of serially connected reaction zones. Preferably, three reaction zones are employed. In each reaction zone, the gaseous admixture is subjected to a reaction temperature of from about 1000 to 1500° F. The effluent from each reaction zone (with the exception of the last one in the series) is successively passed to the next reaction zone in the series. The effluent from the last reaction zone in the series is thereafter further processed to recover the product, benzene, therefrom by known techniques. It is preferred to pass the effluent from the last reaction zone to a high pressure separator wherein it is separated under high pressure into a liquid phase and a gaseous phase. At least a portion of the gaseous phase from the high pressure separator, comprising primarily methane and hydrogen, is then recycled to and combined with the feed to each of the reaction zones. The liquid phase from the high pressure separator, comprising primarily benzene, is further processed to recover the desired hydrodealkylated product therefrom.

The invention will be further illustrated with reference to the accompanying drawing.

Referring to the drawing, the fresh liquid hydrocarbon feed stock is fed into the system by way of line 11. The liquid feed comprises toluene and may contain heavy paraffins and/or higher alkyl benzenes. The alkyl benzene present in the feed can be, for example, toluene, m-xylene, p-xylene, o-xylene, mixed xylenes, ethylbenzene, propylbenzene, butylbenzene and other $C_9$ and $C_{10}$ alkyl benzenes and mixtures of any of these. Although feeds containing the largest practical proportion of toluene are preferred from the standponit of minimizing hydrogen consumption, the higher alkylbenzenes can be present in the feed in any proportion, with good resuults. The heavy paraffins which may be present in the feed can be, for example, hexanes, heptanes, octanes, nonanes, decanes, etc., and mixtures thereof. The hydrocarbon feed will commonly contain from 4 to 12% by volume of heavy paraffins and, generally, from 6 to 10%. Since the process of this invention is specifically designed to hydrodealkylate feed stocks containing significant amounts of heavy paraffins and/or higher alkyl benzenes, the investment and operating costs normally required to produce essentially pure toluene are avoided.

The liquid feed in line 11 is divided into three portions. One portion of the feed comprising about 35% of the total feed is passed through line 12 into line 13. The other two portions, each comprising about 32.5% of the total feed, are passed through lines 14 and 16 into lines 15 and 17, respectively.

Make-up hydrogen-containing gas at an elevated pressure is introduced to the process through line 18 which communicates with line 13. The make-up hydrogen gas stream need not be pure hydrogen. It may contain between about 50 to 100% by volume hydrogen and, preferably, greater than 85% hydrogen. Make-up hydrogen is fed to the system at a rate of from 3500 to 7000 standard cubic feet per barrel of fresh liquid feed and, preferably, from 4000 to 5500 standard cubic feet.

Hydrogen-containing recycle gas obtained from a high pressure separator more fully described hereinafter is introduced into lines 13, 15 and 17 by line 19. About 50% of the total recycle gas is introduced into line 13 and the remaining recycle gas is divided equally between lines 15 and 17. The recycle hydrogen-containing gas may contain between about 35 and 70% by volume hydrogen and, preferably, between about 40 and 55%.

The combined amounts of hydrogen contained in the make-up gas stream introduced by line 18 and in the recycle gas introduced by line 19 are such that the hydrogen to aromatic hydrocarbon mol ratio in line 13 is within the range of from about 1 to 25 and, preferably, 2 to 15.

The reactant feed stream in line 13 comprising toluene, heavy paraffins and/or higher alkyl benzenes, make-up hydrogen-containing gas and recycle hydrogen-containing gas may be preheated in one or more heat exchangers (not shown) wherein heat is supplied by hot effluent from the thermal hydrodealkylation reactors. The reactant stream is passed to heater or furnace 20 wherein final heating of the reactant feed stream up to the reaction temperature is accomplished. The reactor feed stream heated to reaction temperature of about 1150° F. in heater or furnace 20 is then passed by line 21 to the first reactor 22 which has a volume of about 1125 cubic feet. The nominal residence or holding time of the feed in this reactor is about 25 seconds. An effluent at a temperature of about 1330° F. is recovered through the top of the reactor 22 by line 23.

The reactant feed stream in line 15 comprising hydrocarbon feed and recycle hydrogen-containing gas is passed to a heater 24 wherein it is heated to a temperature of about 905° F. The stream is then removed from heater 24 by means of line 25 and is introduced into line 23 wherein it is combined with the effluent from reactor 22. The combined streams in line 23, which have a temperature of about 1215° F., are passed to the second reactor 26 which has a volume of about 625 cubic feet. The nominal residence or holding time of the feed in this reactor is about 11 seconds. An effluent at a temperature of about 1330° F. is recovered through the top of the reactor 26 by line 27.

The stream in line 17 comprising hydrocarbon feed and recycle gas is passed to a heater 28 wherein it is heated to a temperature of about 850° F. The heated stream is withdrawn from heater 28 by line 29 and is combined with the effluent from reactor 26 in line 27. The combined streams, having a temperature of about 1235° F. are introduced into the third reactor 30. This reactor has a volume of about 850 cubic feet and the nominal residence or holding time of the feed in this reactor is about 13 seconds.

The thermal hydrodealkylation reactions which occur in reactors 22, 26 and 30 are conducted at temperatures of from about 1000° to 1500° F. and pressures of from about 300 to 1000 p.s.i.g. with a total contact time or residence time of the reactants in the reactors of from about 10 to 200 seconds. In a preferred embodiment of this invention, the reactions are conducted at temperature of from about 1100° to 1350° F. and pressures of from about 400 to 600 p.s.i.g. for from about 30 to 70 seconds.

Although heaters 20, 24 and 28 have been illustrated as separate units, it will be understood that the invention is not limited thereto. The required heating of the streams can be carried out in a single heater involving three separate coils if desired.

The large amount of recycle gas which is present in the thermal hydrodealkylation reactors (about twice as much as is normally used in a conventional thermal hydrodealkylation process) acts as a heat sink to remove the extra heat generated and thereby minimizes the increase in temperature in the reaction vessels which would otherwise occur due to the excessive amount of heat released during hydrocracking of the heavy paraffins present. There is thus created a smaller temperature rise across the reactors which results in low sensitivity of the process. Sensitivity is defined as the steady-state change in reactor output temperature for a unit change in input temperature.

An effluent at a temperature of about 1330° F. is recovered from the top of reactor 30 by line 31. This effluent contains no heavy paraffins to contaminate the benzene product, thereby simplifying recovery of the benzene product. Moreover, substantially no alkyl benzenes heavier than toluene are present in the effluent.

The large volume of recycle gas in the feed to the thermal hydrodealkylation reactors results in a larger volume of effluent being removed from the reactor 30 than in conventional thermal hydrodealkylation processes. Since the effluent contains a large quantity of heat, it is advantageous to recover this heat; for example, to pass it by line 31 to steam generator 32. Therefore, the practice of this invention renders it possible to recover greater quantities of heat in the form of steam than in a conventional thermal hydrodealkylation process.

The effluent is then passed from steam generator 32 by line 33 through suitable coolers (not shown) to a high pressure separator 34 maintained at a pressure of about 400 p.s.i.g. and a temperature of about 100° F. In the high pressure separator 34, a vaporous stream comprising hydrogen, methane and a small amount of entrained benzene product is separated from a major benzene liquid product stream. At least a portion of the vaporous stream is removed from separator 34 by lines 19 and 35 and is recycled to the feed for the reactors as previously described. Any portion of the vaporous stream which is not recycled is passed through line 36 and may be further treated to obtain maximum recovery of entrained benzene product material by known techniques.

The liquid stream separated in high pressure separator 34 and containing primarily benzene and some unconverted toluene is withdrawn and passed by line 37 to a fractionator (not shown) wherein the benzene product is purified and recovered. Unconverted toluene is removed from the fractionator and recycled by line 38 to the feed in line 13.

The process of this invention results in higher benzene selectivities for a given hydrogen to hydrocarbon feed ratio than conventional thermal hydrodealkylation processes and also results in smaller reactor volume requirements in order to obtain a given conversion per pass of the alkyl benzene feed.

In the interest of simplifying the description of this invention, numerous steps which are conventional in a thermal hydrodealkylation process have been omitted. Such steps include operations such as heat exchange between the hot effluent and the feed, cooling of the effluent, stripping, fractionating, etc. A more detailed description of such operations is included in copending application Ser. No. 558,993, filed June 20, 1966, the disclosure of which is incorporated herein by reference.

The practice of this invention permits the use of a feed containing heavy paraffins and/or higher alkyl benzenes in a thermal hydrodealkylation process. It also results in an improvement in benzene selectivity, less temperature rise through the reactors and less sensitivity of the reactors to fluctuations in the input temperatures, compositions, and flow rates.

The following example illustrates this invention:

*Example*

This example employs the process and apparatus illustrated in the drawing and described hereinabove. A liquid hydrocarbon feed having a content as set forth in the table below is fed to three serially connected reactors as described hereinabove at a rate of 566 mols per hour. Each reactor is operated at a pressure of 500 p.s.i.g. Recycle gas from the high pressure separator is combined with the feed to each of the three reactors as previously described at a total rate of 2471 mols per hour. The combined reactor volume is 2600 cubic feet. The hydrogen to aromatic hydrocarbon mol ratio at the inlet of each of the three reactors is, respectively, 12.22, 7.19 and 5.06. A conversion of 94% per pass is obtained in the thermal hydrodealkylation reaction with a benzene selectivity of 93.5 mol percent.

TABLE

Composition of liquid feed, vol. percent:

| | |
|---|---|
| $C_6$–benzene | 0.21 |
| $C_7$–toluene | 26.42 |
| $C_8$–alkylbenzenes | 32.78 |
| $C_9$–alkylbenzenes | 28.58 |
| $C_{10}$–alkylbenzenes | 3.17 |
| $C_{8-12}$[1] paraffins | 8.84 |
| | 100.00 |

[1] Approximate distribution: $C_8$—40%, $C_9$—30%, $C_{10}$—20%, $C_{11}$—7%, $C_{12}$—3%.

For the purpose of comparison, a conventional thermal hydrodealkylation process is conducted under similar operating conditions. A liquid hydrocarbon feed containing about the same aromatics distribution as above and about 2% by volume of mixed $C_{7-9}$ paraffins is fed to a single thermal hydrodealkylation reactor at a rate of 520 mols per hour along with 1200 mols per hour of recycle gas. The hydrogen to aromatic hydrocarbon mol ratio in the feed at the inlet of the reactor is 5.0. The reactor has a volume of 2600 cubic feet. The reactor is operated at an inlet temperature of about 1110° F. and a pressure of 500 p.s.i.g. The nominal residence or holding time in the reactor is about 65 seconds. The effluent is withdrawn from the reactor at a temperature of about 1330° F. The conversion of aromatics in the feed is about 90% per pass and the benzene selectivity is 92 mol percent.

The amount of recycle gas per mole of fresh feed employed in the feed of the example of this invention is 2.2 times as great as the recycle gas contained in the feed of the comparative example. It will be noted that the process of this invention results in in higher conversion per pass and improved selectivity over that obtained by a conventional thermal hydrodealkylation process.

A conventional thermal hydrodealkylation process cannot be compared to the process of this invention with feeds containing more than about 2% by weight of heavy paraffins, since a conventional thermal hydrodealkylation process cannot cope with the excessive heat evolved by the hydrocracking of higher amounts of heavier paraffins.

Obviously, many modifications and variations of the invention as hereinabove set forth can be made without departing from the spirit and scope thereof; and therefore only such limitations should be imposed as are indicated in the appended claims.

We claim:
1. A process for the thermal hydrodealkylation of toluene which comprises:
    (a) providing a gaseous mixture of hydrogen and a hydrocarbon feed stock comprising toluene;
    (b) separately introducing a portion of said gaseous admixture into each of a plurality of serially connected reaction zones wherein it is subjected to a reaction temperature of from about 1000 to 1500° F.;
    (c) successively passing the effluent from one reaction zone to the next reaction zone in the series;
    (d) withdrawing the effluent from the last reaction zone in the series and recovering therefrom the hydrodealkylated products.
2. A process as defined in claim 1 wherein said effluent from the last reaction zones in the series is separated under high pressure into a liquid phase and a gaseous phase and at least a portion of the gaseous phase is recycled to and combined with the feed to each of said reaction zones.
3. A process as defined in claim 2 wherein the thermal hydrodealkylation reaction is conducted in three serially connected reaction zones.
4. A process as defined in claim 3 wherein said thermal hydrodealkylation reaction is conducted at a pressure of from about 300 to 1000 p.s.i.g. for from about 10 to 200 seconds and the hydrogen to aromatic hydrocarbon mol ratio is within the range of from about 1 to 25.
5. A process as defined in claim 3 wherein said thermal hydrodealkylation reaction is conducted at a temperature of from about 1100° to 1350° F. and a pressure of from about 400 to 600 p.s.i.g. for from about 30 to 70 seconds and the hydrogen to aromatic hydrocarbon mol ratio is within the range of from about 2 to 15.
6. A process as defined in claim 3 wherein said hydrocarbon feed stock contains from 4 to 12% by volume of paraffins containing at least 6 carbon atoms.
7. A process as defined in claim 3 wherein said hydrocarbon feed stock contains from 6 to 10% by volume of paraffins containing at least 6 carbon atoms.
8. A process as defined in claim 3 wherein said hydrocarbon feed stock contains at least one higher alkylbenzene containing 8 to 10 carbon atoms.
9. A process as defined in claim 6 wherein said hydrocarbon feed stock contains at least one higher alkylbenzene containing 8 to 10 carbon atoms.
10. A process as defined in claim 3 wherein said gaseous admixture is distributed essentially evenly between each of said three reaction zones.

References Cited

UNITED STATES PATENTS 3,188,359 6/1965 Lempert et al. _____ 260—672
3,296,323 1/1967 Myers et al. _____ 260—672

DELBERT E. GANTZ, *Primary Examiner.*

G. E. SCHMITKONS, *Assistant Examiner.*